Patented Jan. 29, 1952

2,583,770

UNITED STATES PATENT OFFICE 2,583,770

PROCESS OF PRODUCING THIOSEMICARBAZONES

Erich Goth, Wuppertal-Elberfeld, and Walter Salzer, Wuppertal-Barmen, Germany, assignors to Schenley Laboratories, Inc., New York, N. Y., a corporation of Delaware No Drawing. Application March 3, 1950, Serial No. 147,561. In Switzerland March 4, 1949

4 Claims. (Cl. 260—552)

This invention relates to therapeutic intermediates and has for an object the provision of an improved method or process for producing such products. More particularly, the invention contemplates the provision of an improved method or process for producing thiosemicarbazones of ketones.

The method of producing such thiosemicarbazones in accordance with heretofore customary practices requires two processing steps, namely, (1) the conversion of hydrazine thiocyanate into thiosemicarbazide and (2) the reaction of the resulting thiosemicarbazide with the ketone. The conversion of hydrazine thiocyanate into thiosemicarbazide proceeds very slowly in aqueous solution and is limited by the establishment of an equilibrium. Substantial losses occur during the purification of the thiosemicarbazide owing to the necessity of separating inorganic salts.

It is an object of the invention to provide a process by which thiosemicarbazones of ketones can be produced in a single step with avoidance of the difficulties encountered heretofore.

Further objects will become apparent as the following specification proceeds.

We have found that the conversion of hydrazine thiocyanate into thiosemicarbazide occurs almost instantly when the reaction is carried out in the presence of a ketone with a yield of up to 90 per cent. The thiosemicarbazide thus formed reacts immediately with the ketone to form the ketone thiosemicarbazone and is thus removed from the equilibrium. Owing to its slight solubility, the ketone thiosemicarbazone is obtained in a high degree of purity so that purification for further reactions is not necessary. The almost quantitative conversion into thiosemicarbazone is surprising because the formation of hydrazono compounds was to be expected on reacting hydrazine and ketones. Such a course of the reaction—as has been ascertained—actually predominates on using aldehydes.

Any suitable ketone may be employed for the reaction with hydrazine thiocyanate in accordance with the invention, but simple aliphatic or cycloaliphatic ketones are preferred.

The reaction may be carried out in an aqueous solution. Further solvents or diluents may be added if desired.

The ketone-thiosemicarbazones obtained according to the present invention are useful as intermediates for the production of therapeutic agents.

The invention is further illustrated by the following examples; parts being by weight.

Example 1

A solution of ninety-seven (97) parts of potassium thiocyanate in two hundred (200) parts of water is added to a solution of eighty-one (81) parts of neutral hydrazine sulfate in two-hundred (200) parts of water and heated to 90° C. for a short period of time. The mixture is cooled and the liquid is separated from the precipitated potassium sulfate by suction filtration. The filtrate, containing hydrazine thiocyanate, is heated to 60° C. At this temperature seventy-five (75) parts of acetone are added during the course of a few minutes. After a short time, acetone-thiosemicarbazone begins to separate in exothermic reaction. After cooling the precipitate is filtered off on a suction filter and washed with ice-cold water. The yield is one hundred and twenty (120) parts of acetone-thiosemicarbazone with a melting point of 180° C.

Example 2

Five hundred and seventy-eight (578) parts of the mixture of hydrazine sulfate and potassium thiocyanate solution obtained as described in Example 1 are cooled after heating to 90° C. and diluted with two hundred (200) parts of methanol. The mixture is filtered through a suction filter and separated from the precipitated potassium sulfate. The filtrate comprising aqueous hydrazine thiocyanate solution containing methanol is refluxed with ninety-eight (98) parts of cyclohexanone for some time. After cooling, the precipitated cyclohexanone-thiosemicarbazone is isolated. The yield is one hundred and forty (140) parts of cyclohexanone-thiosemicarbazone with a melting point of 159° C.

We claim:

1. The process of producing thiosemicarbazones of cycloaliphatic ketones, which comprises heating under reflux an aqueous organic solvent medium containing, in dissolved state, a high concentration of hydrazine-thiocyanate with substantially equimolecular proportions of a cycloaliphatic ketone and, after cooling, recovering the ketone thiosemicarbazone from the solvent medium.

2. The process of producing thiosemicarbazones of ketones, which comprises heating under reflux an aqueous organic solvent medium containing, in dissolved state, a high concentration of hydrazine-thiocyanate with a substantially equimolecular proportion of cyclohexanone and, after cooling, recovering cyclohexanone-thiosemicarbazone from the solvent medium.

3. The process defined in claim 2 wherein the aqueous organic solvent medium is an aqueous lower alkanol.

4. The process defined in claim 3 wherein the lower alkanol is methanol.

ERICH GOTH.
WALTER SALZER.

REFERENCES CITED

The following references are of record in the file of this patent:

Cattelain, "Comptes Rendus," vol. 209, November 27, 1939, p. 800.